US008898083B2

(12) United States Patent
Skaaksrud et al.

(10) Patent No.: US 8,898,083 B2
(45) Date of Patent: Nov. 25, 2014

(54) SYSTEMS AND METHODS FOR ELECTRONICALLY SIGNING FOR A DELIVERED PACKAGE

(75) Inventors: Ole-Petter Skaaksrud, Lakeland, TN (US); Miley Ainsworth, Hernando, MS (US)

(73) Assignee: FedEx Corporate Services, Inc., Collierville, TN (US)

( * ) Notice: Subject to any disclaimer, the term of this patent is extended or adjusted under 35 U.S.C. 154(b) by 0 days.

(21) Appl. No.: 13/428,863

(22) Filed: Mar. 23, 2012

(65) Prior Publication Data

US 2012/0246077 A1     Sep. 27, 2012

Related U.S. Application Data

(60) Provisional application No. 61/467,103, filed on Mar. 24, 2011.

(51) Int. Cl.
*G06F 21/00* (2013.01)
*G06Q 10/08* (2012.01)

(52) U.S. Cl.
CPC .................................. *G06Q 10/0833* (2013.01)
USPC .......................................................... 705/50

(58) Field of Classification Search
CPC ............................................... G06Q 10/0835
USPC ........................................................... 705/50
See application file for complete search history.

(56) References Cited

U.S. PATENT DOCUMENTS

| 7,222,081 B1* | 5/2007 | Sone .............................. 705/333 |
| 8,036,993 B2* | 10/2011 | Estes ............................. 705/338 |
| 2001/0054025 A1* | 12/2001 | Adams et al. ................... 705/50 |
| 2002/0111914 A1 | 8/2002 | Terada et al. |
| 2007/0192111 A1* | 8/2007 | Chasen ............................. 705/1 |
| 2007/0220271 A1* | 9/2007 | Law ............................... 713/185 |
| 2011/0087887 A1 | 4/2011 | Luft et al. |
| 2012/0323645 A1* | 12/2012 | Spiegel et al. ............... 705/14.1 |

FOREIGN PATENT DOCUMENTS

| GB | 2455812 | 6/2009 |
| JP | 2004158025 | 6/2004 |
| WO | WO 00/72506 | 11/2000 |
| WO | WO 2006/065945 | 6/2006 |
| WO | WO 2009/101549 | 8/2009 |

OTHER PUBLICATIONS

International Search Report and Written Opinion dated Jul. 12, 2012, for Application No. PCT/US2012/030435 (15 pages).
Menezes A J et al: "Handbook of Applied Cryptography", Oct. 16, 1996, CRC Press, XP002655261, pp. 397-405.

(Continued)

*Primary Examiner* — Charles C Agwumezie
(74) *Attorney, Agent, or Firm* — Finnegan, Henderson, Farabow, Garrett & Dunner, LLP

(57) ABSTRACT

There is disclosed a method. The method includes identifying, using a mobile device, an encrypted electronic token associated with at least one physical package designated for delivery to a destination. The electronic token having been encrypted by a first key associated with a particular party. The method also includes electronically signing, using the mobile device, for the at least one physical package. This includes initiating a decryption of the encrypted electronic token with a second key associated with the particular party.

27 Claims, 6 Drawing Sheets

100

(56) References Cited

OTHER PUBLICATIONS

Wikipedia: "Security token", Internet Article, Mar. 7, 2011, XP55031606, Retrieved from the Internet: URL: http://en.wikipedia.org/w/index.php?title=Security_token&oldid=417616703 [retrieved on Jul. 3, 2012] Sections "Digital signature" "Connected tokens", "Smartcards", "Contactless tokens", "Bluetooth tokens" and "GSM cellular phones", (13 pages).

Wikipedia: "Mobile commerce", Internet Article, Mar. 18, 2011, XP55031694, Retrieved from the Internet: URL:http://en.wikipedia.org/w/index.php?title=Mobile_commerce&oldid=419441186 [retrieved on Jul. 4, 2012], (8 pages).

European Patent Office, Examination Report dated Aug. 28, 2014, 11 pages.

Menezes A J et al., Handbook of Applied Cryptography, Jan. 1, 1997, pp. 0-xxi, CRC Press.

Wikipedia, Location-Based Service, http://en.wikipedia.org/w/index.php?title=Location-based_service&oldid=420215652, retrieved Aug. 20, 2014, 7 pages.

Wikipedia, Comparison of Smartphones, Mar. 22, 2011, http://en.wikipedia.org/w/index.php?title=Comparison_of_smartphones&oldid=420060661, retrieved Aug. 21, 2014, 13 pages.

* cited by examiner

SYSTEMS AND METHODS FOR ELECTRONICALLY SIGNING FOR A DELIVERED PACKAGE

RELATED APPLICATION

This application claims priority from U.S. Provisional Application No. 61/467,103, filed Mar. 24, 2011, the entire contents of which are hereby incorporated by reference.

TECHNICAL FIELD

The present disclosure generally relates to the field of computerized systems. More particularly, the disclosure relates to computerized systems and methods for signing for a delivered package.

BACKGROUND INFORMATION

Conventional systems permit a party to place an order for goods online, over the telephone, or by mail. For example, using a computer or mobile device, the party may access a website of a retailer, such as Amazon, to select the desired goods and place the order. With the order, the party may include a name and/or address to indicate to whom and where the package should be delivered. For example, the party may indicate his/her own name and address.

Using a delivery company, the retailer may then ship packages of the order to the party at his/her name and/or address. In some cases, the packages must be signed for by the party included on the order. This may be the case, for example, if the package includes valuable, sensitive, or private goods. To ensure that an authorized party signs for the package, the delivery company may request that the party signing for the order present identification. The delivery company may then transfer the package to the authorized party after s/he signs for it.

In some cases, however, the party receiving the package may want to remain anonymous to the delivery company to maintain his/her privacy. Moreover, some countries may have privacy laws that prohibit the delivery company from tracking and/or checking identification information of its customers. Thus, it may be important to permit an authorized party to anonymously sign for a delivered package.

In some cases, the party receiving the package may be in a different location from the location included with the order. Thus, it may be important to permit the receiving party to have a package delivered to him/her based on a real-time location.

SUMMARY

In accordance with disclosed embodiments, there is provided a method comprising: identifying, using a mobile device, an encrypted electronic token associated with at least one physical package designated for delivery to a destination, the electronic token having been encrypted by a first key associated with a particular party; and electronically signing, using the mobile device, for the at least one physical package, including initiating a decryption of the encrypted electronic token with a second key associated with the particular party.

In accordance with disclosed embodiments, there is further provided a computer-readable medium storing instructions, which, when executed by at least one processor, cause the at least one processor to perform a method comprising: identifying, using a mobile device, an encrypted electronic token associated with at least one physical package designated for delivery to a destination, the electronic token having been encrypted by a first key associated with a particular party; and electronically signing, using the mobile device, for the at least one physical package, including initiating a decryption of the encrypted electronic token with a second key associated with the particular party.

In accordance with disclosed embodiments, there is further provided a system comprising: a receiving mobile device configured to: identify an encrypted electronic token associated with at least one physical package designated for delivery to a destination, the electronic token having been encrypted by a first key associated with a particular party; and electronically sign for the at least one physical package, including initiating a decryption of the encrypted electronic token with a second key associated with the particular party.

In accordance with disclosed embodiments, there is further provided a method performed by a mobile device, the method comprising: identifying an encrypted electronic token associated with at least one physical package designated for delivery to a destination, the electronic token having been encrypted by a key associated with an party that is associated with the at least one physical package.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate disclosed embodiments and together with the description, serve to explain the principles of the disclosed embodiments.

DETAILED DESCRIPTION

Figure 1:
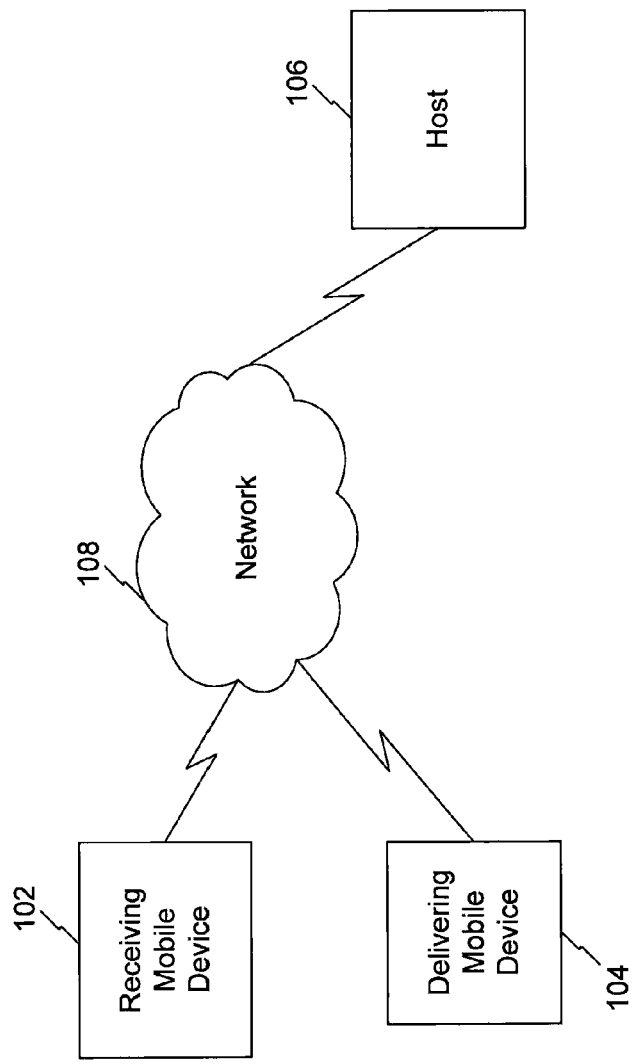
FIG. 1 illustrates an exemplary system for electronically signing for a delivered package.

Some disclosed embodiments generally relates to electronically signing for a package in a manner that is decoupled from the identity and/or location of the signing party. This may allow a party receiving the package to protect his/her identity. This may also afford the receiving party the flexibility to receive the package in a location that is different from a location included with the order.

In disclosed embodiments, a party who places an order for goods with a retailer has a public key and a private key, as is generally understood in the art. The public and/or private keys may be maintained by a Public Key Infrastructure (PKI). For example, the public key may be distributed freely, while the private key may only be in the possession of a restricted number of users.

When the order is placed, the retailer may generate an electronic token. The electronic token may be a series of alphanumeric characters, a bit stream, a series of numbers, or any other electronic representation. The electronic token may be randomly-generated or may be linked to something, such as a biometric. For example, disclosed embodiments may run an algorithm, such as a hash function, on some known biometric data of the ordering party, such as their name of fingerprint data, to generate the electronic token.

The retailer, or some other party, may encrypt the electronic token with a public key of the ordering party. The encrypted token may appear as a random stream of characters, such as a seemingly-random stream of 1s and 0s. The encrypted token may be associated with the package. For example, the encrypted token may be printed as a barcode on the package or stored on an RFID tag on the package. Alternatively or additionally, the encrypted token may be stored on a mobile device of a party that delivers the package or on a host associated with the delivery company or third party.

In some embodiments, another party, such as a party that ships and/or delivers the package, may encrypt the electronic token. In some embodiments, the public-private key may be maintained, generated, and/or associated with the party that ships and/or delivers the package.

The ordering party may have a private key that can unlock the encrypted electronic token. The ordering party may share the private key with another party, such as a receiving party, permanently or for a limited amount of time. The receiving party may determine that the package is out for delivery. The receiving party may indicate that a party delivering the package should deliver it to a current location of the receiving party, or some other location, instead of a location listed with the order.

The delivering party may alter his/her delivery route to deliver the package to a location of the receiving party, for example. The delivering party may "check-in" at a delivery location, for example, with the receiving party. For example, the delivering party may engage in a near field communication (NFC) "bump" with the receiving party's mobile device to verify that the delivering party has arrived at the exact location of the receiving party. In some embodiments, the delivering party may check-in at a delivery location by, for example, engaging in NFC communications with a fixed NFC tag. The NFC bump may, in some embodiments, transfer the encrypted electronic token to the receiving mobile device. The receiving mobile device may receive the encrypted electronic token from a host, or may not receive the encrypted electronic token at all in some embodiments. The receiving mobile device may initiate decryption of the electronic token. When the electronic token is successfully decrypted, then the receiving party may be considered to have executed an electronic signature and the delivering party may leave the package in possession of and/or accompanying the receiving party.

The term "NFC bump" is commonly-understood in the art, and may refer to bringing two NFC-capable devices together, for example, where one acts as a NFC reader/writer and the other acts as a NFC tag for the purpose of exchanging information. The device acting as a tag, may be a smart phone emulating a NFC tag. In some embodiments, both devices may have reader/writer functionality, and one may initiate pushing information to the other or attempting to receive information from the other, as though the other device is a fixed NFC tag. And in some embodiments a delivering mobile device may check-in at a delivery location using a fixed NFC tag instead of via an NFC bump.

As used herein, the term "party" is intended to apply broadly to an individual, group, or corporate entity that may order, deliver, or otherwise participate in the order, fulfillment, or delivery of a package.

In one example embodiment, one or more mobile devices, such as a delivering mobile device, may be associated with a package; in other words, the one or more mobile devices may be placed within a package, attached to a package, or otherwise placed within a vicinity of the package. In disclosed embodiments, the package may be a physical package designated for delivery to a destination.

The precise location of a mobile devices in relation to the package (within, attached, within the vicinity, or in close proximity, for example) may not matter; what matters is that in some embodiments, the one or more mobile devices can effectively collect the particular type of information associated with the package and/or its contents. For example, this sensor-collectable information may include geographic location information associated with the package at any given time. For purposes of this disclosure, a container or package may be a box, envelope or any other media used to ship documentation or products from one point to another. "Goods" may refer to the item(s) in the container or package.

Reference will now be made in detail to exemplary embodiments, examples of which are illustrated in the accompanying drawings. Wherever possible, the same reference numbers will be used throughout the drawings to refer to the same or like parts.

FIG. 1 illustrates system 100 for electronically signing for a delivered package. System 100 may include receiving mobile device 102, delivering mobile device 104, and/or host 106, connected via network 108. Receiving mobile device 102 may be in possession of and/or accompanying a party receiving a shipped package, while delivering mobile device 104 may be in possession of and/or accompanying a party delivering the shipped package. Host 106 may be associated with a third-party application running on receiving mobile device 102 and/or delivering mobile device 104. In some embodiments, host 106 may be associated with a delivery company and may store data relating to delivery of the package.

Network 108 may be a shared, public, or private network, may encompass a wide area or local area, and may be implemented through any suitable combination of wired and/or wireless communication networks. Furthermore, network 108 may comprise a local area network (LAN), a wide area network (WAN), an intranet, or the Internet. Network 108 may be a cloud network, a mesh network, or some other kind of distributed network. In some embodiments, some combination of receiving mobile device 102, delivering mobile device 104, and/or host 106 may be directly connected, via a wired or wireless connection, instead of connecting through network 108.

Delivering mobile device 104 may accompany a party delivering a package to a designated destination. Delivering mobile device 104 may collect location information, and may publish that location information via host 106. For example, delivering mobile device 104 may periodically send its location to host 106.

Receiving mobile device 102 may track the location of the package by interrogating host 106 on the whereabouts of delivering mobile device 104. Receiving mobile device 102 may also determine from host 106 whether the package is in transit to its designated destination, out for delivery, and/or when the package is expected to be shipped or delivered. In general, receiving mobile device 102 may retrieve various types of information associated with the order or shipment of the package from host 106. In some embodiments, receiving mobile device 102 may receive information directly from delivering mobile device 104.

Delivering mobile device 104 may be en route to delivering the package to an address or location designated with the order. While delivering mobile device 104 is en route, receiving mobile device 102 may indicate to host 106 that it would like delivering mobile device 104 to deliver the package to a current location of mobile device 104 or some other location. Delivering mobile device 104 then take an alternative route to deliver the package to the new designated location.

At delivery, delivering mobile device 104 may check-in at a delivery location, for example, with receiving mobile device 102, and may cause an encrypted electronic token to be transferred to receiving mobile device 102. Receiving mobile device 102 may decrypt the electronic token, thereby anonymously signing for the package.

System 100 is exemplary, and the number and distribution of the various entities shown may be different depending on specific embodiments. For example, the components in system 100 may be combined and/or distributed over multiple entities, including other computers, handheld computers, mobile phones, tablet computers, or other computing platform. Thus, the configuration described in system 100 is an example only and is not intended to be limiting.

Figure 2:
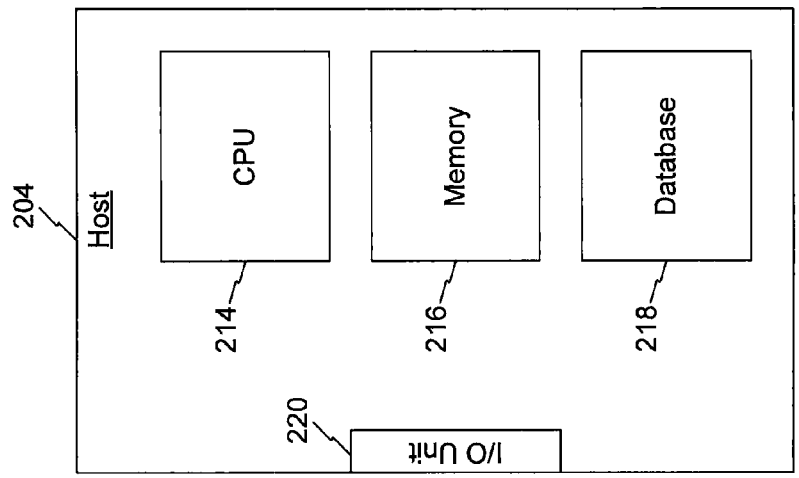
FIG. 2 illustrates devices of an exemplary system for electronically signing for a delivered package.
Figure 2:
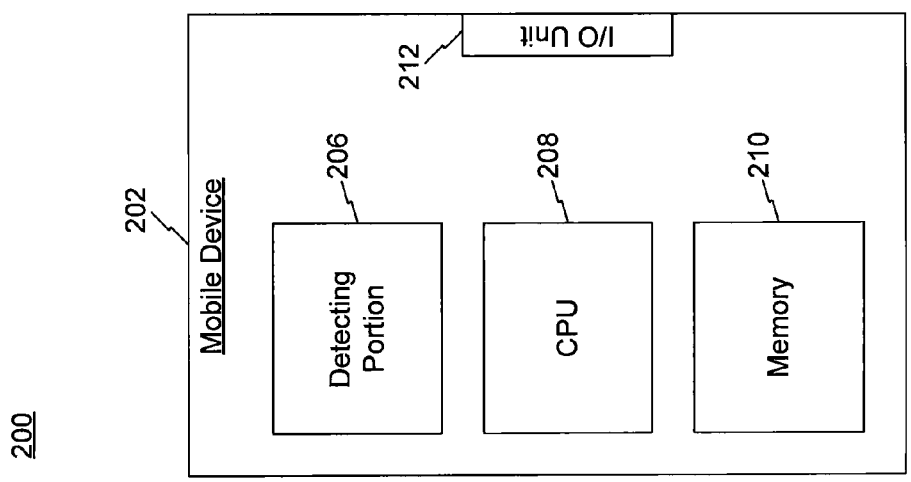

FIG. 2 illustrates devices of an exemplary system 200 for electronically signing for a delivered package. System 200 may include mobile device 202 and host 204. Mobile device 202 may be similar to receiving mobile device 102 and/or delivering mobile device 104 from FIG. 1, and host 204 may be similar to host 106. Both mobile device 202 and host 204 may include general-purpose computing components configured to execute special-purpose instructions or code to perform certain actions.

Mobile device 202 may include detecting portion 206, which may include one or more software and/or hardware components for collecting data, such as environmental data. For example, detecting portion 206 may collect location information about itself. In some embodiments, location information may include the use of a Global Positioning System (GPS). Alternately, location information may be determined through cellular triangulation, wireless network association, the capture of fixed location scan, an NFC bump, or the capture of mobile location scan. Some exemplary aspects of mobile device 202 are described in U.S. application Ser. Nos. 13/351,861 and 13/351,852, the entire contents of which are hereby incorporated by reference.

Mobile device 202 may also include central processing unit (CPU) 208 and memory 210 to process data, such as the collected environmental data, inputted data, or data retrieved from a storage device. CPU 208 may include one or more processors configured to execute computer program instructions to perform various processes and methods. CPU 208 may read the computer program instructions from memory 210 or from any computer-readable medium. Memory 210 may include random access memory (RAM) and/or read only memory (ROM) configured to access and store information and computer program instructions. Memory 210 may also include additional memory to store data and information and/or one or more internal databases to store tables, lists, or other data structures.

Mobile device 202 may include I/O Unit 212 for sending data over a network or any other medium. For example, I/O Unit 212 may send data over a network, point-to-point, and/or point-to-multipoint connection either wirelessly or over a cable.

Host 204 may include a CPU 214 and/or a memory 216, which may be similar to CPU 208 and memory 210 from mobile device 202. Host/Storage Device 204 may also include database 218. Database 218 may store large amounts of data, and may include a magnetic, semiconductor, tape, optical, or other type of storage device. In some embodiments, database 218 may store historical data for auditing purposes. Host/storage device 204 may include an I/O Unit 220 for communicating with mobile device 202. I/O Unit 220 may be similar to I/O Unit 212 on mobile device 202.

System 200 is exemplary only, and the number and distribution of the various entities shown may be different depending on specific embodiments. For example, in some embodiments, mobile device 202 may not include detecting portion 206, CPU 208, and/or memory 210. In some embodiments, host 204 may be distributed over multiple entities, including other distribution systems, sensors, computers, handheld computers, mobile phones, tablet computers, or other computing platform. Mobile device 202 may similarly be implemented or distributed over any computing platform. Thus, the configuration described in system 200 is an example only and is not intended to be limiting.

Figure 3:
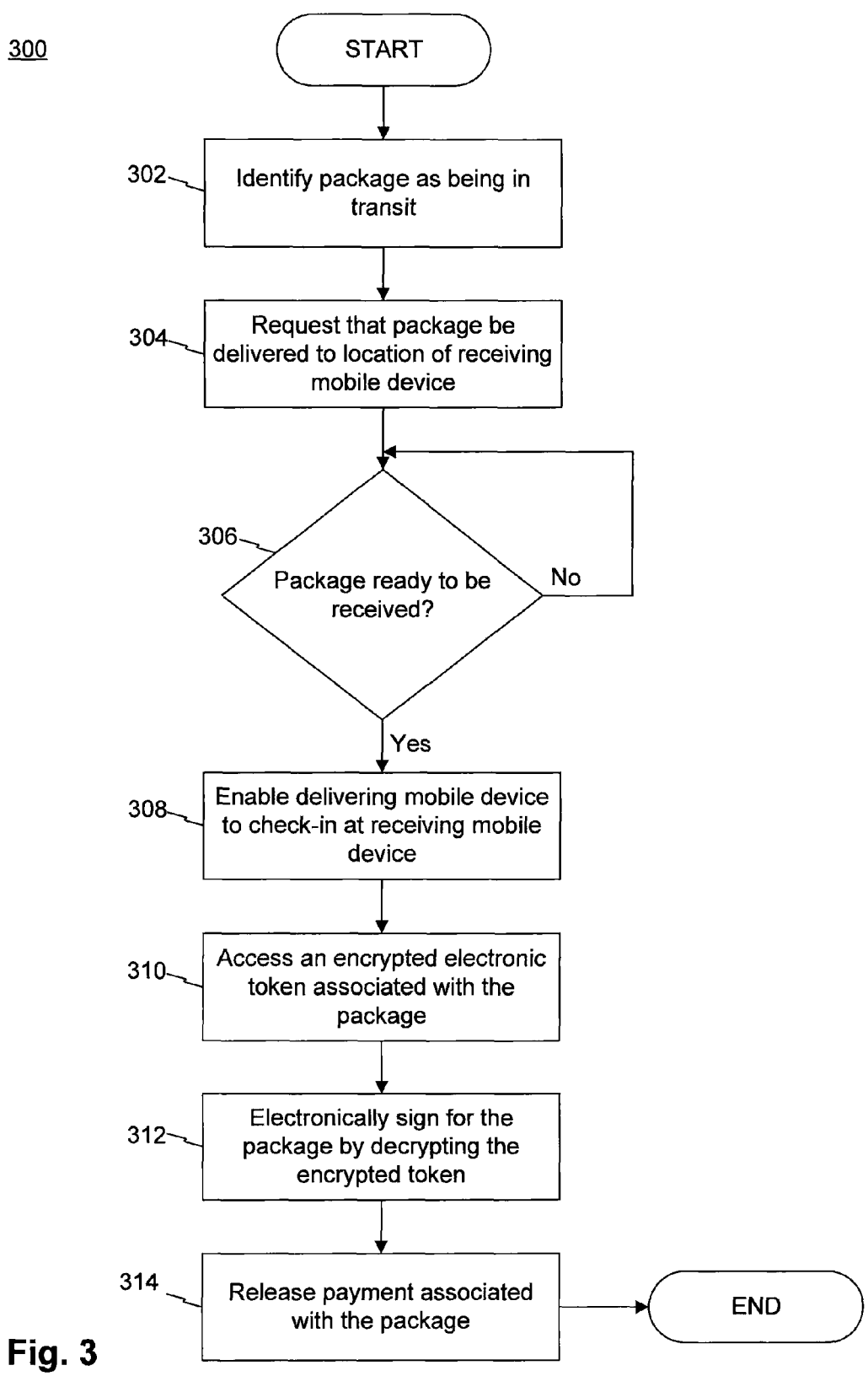
FIG. 3 illustrates the operations of an exemplary method performed by a receiving mobile device for electronically signing for a delivered package.

FIG. 3 illustrates the operations of an exemplary method 300 that may be performed by receiving mobile device 102 for electronically signing for a delivered package. Method 300 may be executed by CPU 208 on receiving mobile device 102. Method 300 may also be performed in conjunction with other components shown or not shown in system 100. As explained, in some implementations, some steps in method 300 are optional and can be rearranged. Additional steps can also be added to method 300.

To begin, receiving mobile device 102 may identify a package as being in transit (step 302). For example, receiving mobile device 102 may receive a notification from host 106 that the package is out for delivery to a designated destination. Host 106 may be monitoring the status of delivering mobile device 104 to determine its location and whether or not it is associated with the package. When host 106 determines that the package is out for delivery with delivering mobile device 104, it may send the notification to receiving mobile device 102.

Next, receiving mobile device 102 may send a message to host 106, requesting that the package be delivered to a location of receiving mobile device 102 (step 304). For example, a party in possession of and/or accompanying receiving mobile device 102 may be out to lunch, and may want the package delivered to his/her current location instead of a location designated with the original order. In disclosed embodiments, receiving mobile device 102 may specify its current location for delivery if it determines that the package will be delivered within a certain amount of time (e.g., 30 minutes), for example. Alternatively, receiving mobile device 102 may specify another location for delivery if the package will be delivered at a later time (e.g., in 2 hours), for example. In this way, receiving mobile device 102 may dynamically adjust the delivery location based on real-time circumstances. In some embodiments, the delivery company may charge extra for a change in delivery location.

Receiving mobile device 102 may then determine whether or not the package is ready to be received (step 306). For example, receiving mobile device 102 may receive a notification from host 106 that delivering mobile device 104 is within a predetermined distance or time period from receiving mobile device 102. This determination may be made in accordance with GPS information. For example, host 106 may monitor the location of delivering mobile device 104 and send a notification to receiving mobile device 102 when the location information (such as GPS coordinates) show delivering mobile device 104 at the same or similar GPS coordinates as receiving mobile device 102. For example, host 106 may notify receiving mobile device 102 that the package is ready to be received when delivering mobile device 104 is near the front door or the loading dock.

If the package is not ready to be received, then receiving mobile device 102 keeps checking until the package is ready to be received. If the package is ready to be received, then receiving mobile device 102 may enable delivering mobile device 104 to check-in at a delivery location, for example, at receiving mobile device 102 (step 308). This may be done using a form of location tracking that is more precise than GPS. For example, delivering mobile device 104 may exchange short-range messages with receiving mobile device 102, such as via Bluetooth, an NFC bump, and/or a barcode scan. The check-in may ensure that a delivery party actually delivers the package directly to a delivery location and/or receiving party. Receiving mobile device 102 may send a confirmation of the check-in to host 106. In this way, host 106 can ensure that the delivering party delivered the package at the location requested by the recipient.

Next, receiving mobile device 102 may access an encrypted electronic token associated with the package (step 310). For example, during the check-in, delivering mobile device 104 may transfer the encrypted electronic token to receiving mobile device 102. Alternatively or additionally, receiving mobile device 102 may scan or read the encrypted electronic token from the package, such as from a barcode or an RFID tag. In some embodiments, host 106 may send the encrypted electronic token to receiving mobile device 102 via network 108 or otherwise, either at the time of check-in or beforehand, such as at the time the product was ordered.

The encrypted electronic token may have been encrypted by a public key associated with a particular party, such as a party who placed the original order, or some other party. Because the key may be public, it may have been accessible to the retailer, for example, who may have generated a token and encrypted the generated token when the order was placed or shipped, or at any other time.

Receiving mobile device 102 may then electronically sign for the package by decrypting the encrypted token (step 312). For example, receiving mobile device may possess a corresponding private key of a the particular party. The private key may be able to undo the encryption of the token that was performed using the public key. Thus, receiving mobile device 102 may be able to decrypt the encrypted electronic token to determine the original electronic token. Receiving mobile device 102 may send the decrypted electronic token to host 106 to verify that a party in possession of and/or accompanying receiving mobile device 102 is authorized to receive the package.

Receiving mobile device 102 may require additional security measures from a party that possesses it, so that the party may electronically sign for the package. For example, receiving mobile device 102 may require a password or biometric scan to permit a party to utilize the functionality described herein, including the ability to electronically sign for a package. The private key may itself be transferred in encrypted mode and never be directly accessible by the user. Instead, the private key may only be accessible to an application running on receiving mobile device 102 and/or host 106. For example, the application may be running in a protected area on mobile device 102 and/or host 106.

When receiving mobile device 102 sends the decrypted electronic token back to host 106, and if the decrypted electronic token matches the original unencrypted token, then host 106 may verify that the party receiving the package is authorized. Host 106 may have to communicate with some other party, such as a retailer, to verify that the decrypted token matches the original unencrypted token. In this way, host 106 may never need to collect identity information of a receiving party, which would protect the privacy of the receiving party and may ensure compliance with local laws.

Next, receiving mobile device 102 may release payment associated with the packages (step 314). For example, the order may have been structured to use cash on demand (COD) payment. Thus, when the electronic signature is verified and the delivering party transfers possession of the package to the receiving party, payment can be transferred. In some embodiments, the receiving party may have a chance to inspect the package before confirming that the payment be transferred. This may give the receiving party an opportunity to determine whether the product is damaged. Method 300 may then end.

Figure 4:
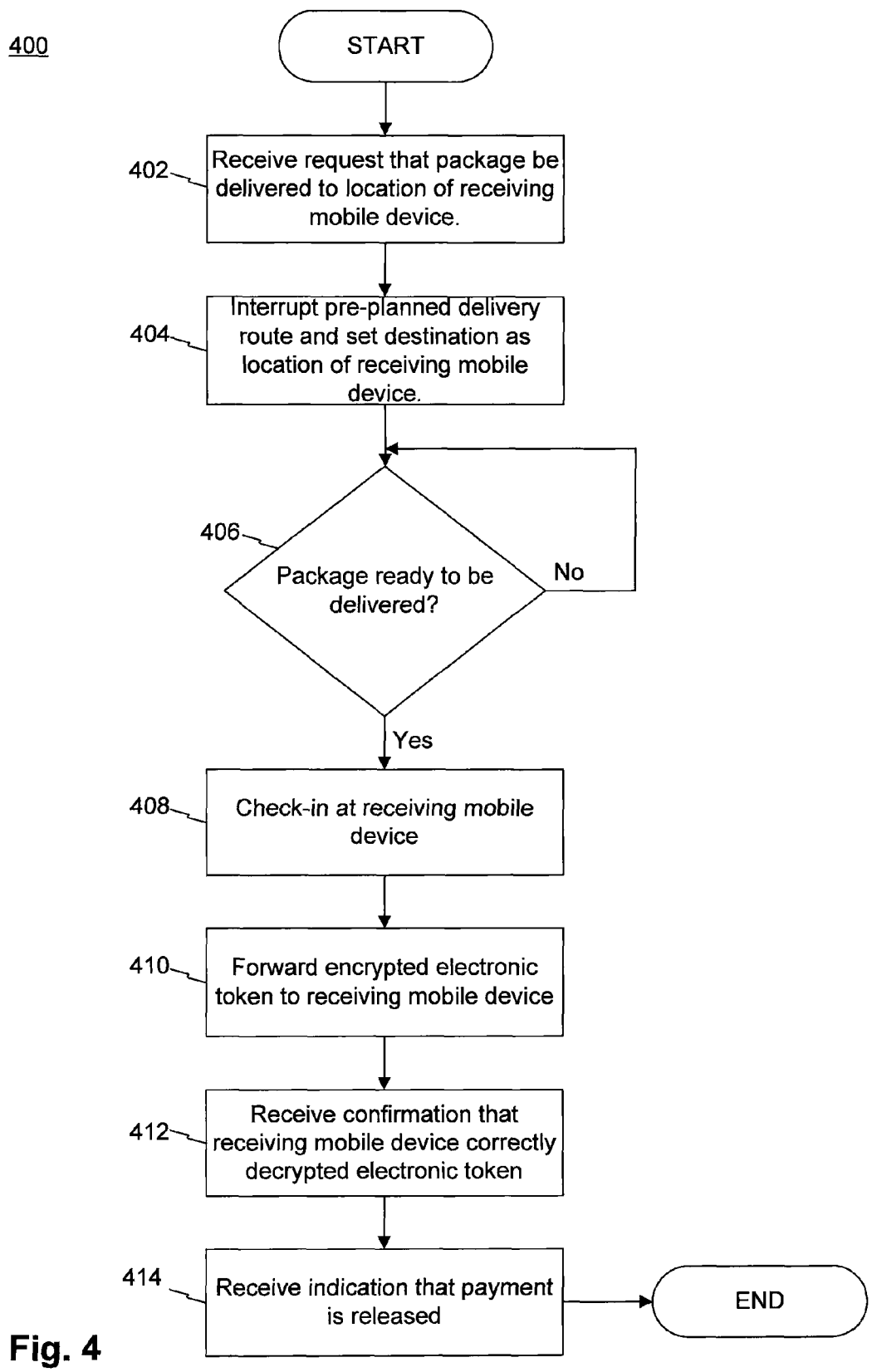
FIG. 4 illustrates the operations of an exemplary method performed by a delivering mobile device for enabling electronically signing for a delivered package.

FIG. 4 illustrates the operations of an exemplary method 400 performed by a delivering mobile device 104 for enabling electronically signing for a delivered package. Method 400 may be executed by CPU 208 on delivering mobile device 104. Method 400 may also be performed in conjunction with other components not shown in system 100. As explained, some steps in method 400 are optional and can be rearranged. Additional steps can also be added to method 400.

Method 400 begins when delivering mobile device 104 receives a request that a package be delivered to a location of receiving mobile device 102 (step 402). Delivering mobile device 104 may receive this request from host 106, which in turn may have received the request from receiving mobile device 102. In some embodiments, delivering mobile device 104 may receive the request from receiving mobile device 102 directly or via another party. When delivering mobile device 104 receives this message, it may already be in transit. For example, delivering mobile device 104 may be travelling with a delivering party that is out for delivery with a plurality of packages, including the package to be delivered to a location of receiving mobile device 102. In one example, the delivering party may be a driver in possession of and/or accompanying delivering mobile device 104. The delivering party may have many packages in his/her truck for delivery in a shift, such as in one day. The packages in the truck may be linked with delivering mobile device 104. In this way, a location of the packages and of the delivering party can be monitored using location information collected by delivering mobile device 104.

Delivering mobile device 104 may then interrupt a pre-planned delivery route and set a destination as the location received from receiving mobile device 102 (step 404). For example, delivering mobile device 104 may have intended to deliver the package to a location on the package order, but may revise a pre-planned route so that the package may be delivered at the location specified by the receiving mobile device 102. Delivering mobile device 104 may immediately deliver the package to a location of receiving mobile device 102 or may do so at a later time depending on one or more factors such as: timing of delivery information provided by receiving mobile device 102, traffic conditions, weather conditions, etc.

Delivering mobile device 104 may then determine whether or not the package is ready to be delivered (step 406). For example, delivering mobile device 104 may determined that the package is ready to be delivered when it arrives a location of the receiving mobile device 102. If delivering mobile device 104 determines that the package is not yet ready to be delivered, then it continues to check.

Alternatively, if the delivering mobile device 104 determines that the package is ready to be delivered, then delivering mobile device 104 may check-in at a delivery location, for example, at receiving mobile device 102 (step 408). For example, delivering mobile device may exchange a short distance message with receiving mobile device 102, such as a Bluetooth message, NFC bump, or RFID scan, to confirm that it delivered the package to the receiving party and not just in a nearby vicinity.

In some embodiments, delivering mobile device 104 may check-in at an NFC stationary tag. The stationary tag may be located, for example, at a loading dock, door, or other location. The delivering mobile device 104 may write to the NFC tag to create a record that it checked-in at the location of the NFC tag. Alternatively or additionally, the delivering mobile device 104 may read from the NFC tag.

Next, delivering mobile device 104 may optionally forward an encrypted electronic token to receiving mobile device 102 (step 410). This may occur as part of the NFC bump, for example, as part of the check-in process. In other embodiments, delivering mobile device 104 may not forward this encrypted electronic token, and receiving mobile device may receive the encrypted electronic token in some other way. In some embodiments delivering mobile device 104 may not forward the encrypted electronic key, and receiving mobile device 102 may gain access to it in some other way, for example, via host 106. Thus, in some embodiments delivering mobile device 104 may not even have access to the encrypted electronic token.

Receiving mobile device 102 may initiate decryption of the encrypted electronic token, and host 106 may verify that the decryption was successfully executed. Thus, delivering mobile device 104 may receive confirmation that the receiving mobile device correctly decrypted the electronic token, for example, from host 106 (step 412). This is an indication to delivering mobile device 104 that receiving mobile device 102 has successfully electronically signed for the package. Thus, delivering mobile device 104 may indicate to the delivering party that the shipment is complete and then he/she can transfer possession of the package to the receiving party and depart.

In some embodiments, receiving mobile device 102 may release payment upon confirmation that the electronic signature was accepted by host 106. Thus, delivering mobile device may receive an indication from host 106 that payment was released. In some embodiments, delivering mobile device 104 may not transfer possession of the package unless payment is first released by the receiving party. Method 400 may then end.

As discussed, a delivered packaged may be electronically signed by a party who does not have to provide any personally-identifiable information such as his/her name, fingerprints, or other biometrics. Instead, the receiving party may only needs to have access to a private key in order to decrypt an electronic token associated with the package. The electronic token may have been encrypted by a public key of a party that ordered goods in the package. The private key therefore, may be the compliment of the public key, in that it may be able to decrypt the encryption performed using the public key. Possession of the private key may be tightly controlled. In this way, a receiving party can prove that he/she is linked to the ordering party and is authorized to receive the package by virtue of the fact that s/he has access to the private key. And the receiving party can prove that he/she has access to the private key by enabling the decryption of the encrypted token, which generally only the private key can accomplish.

Thus, in some embodiments, the party receiving the package may be different from the party who ordered the package. For example, the party ordering the package may share his/her private key with the party receiving the package to ensure that the receiving party is authorized to receive it.

Figure 5:
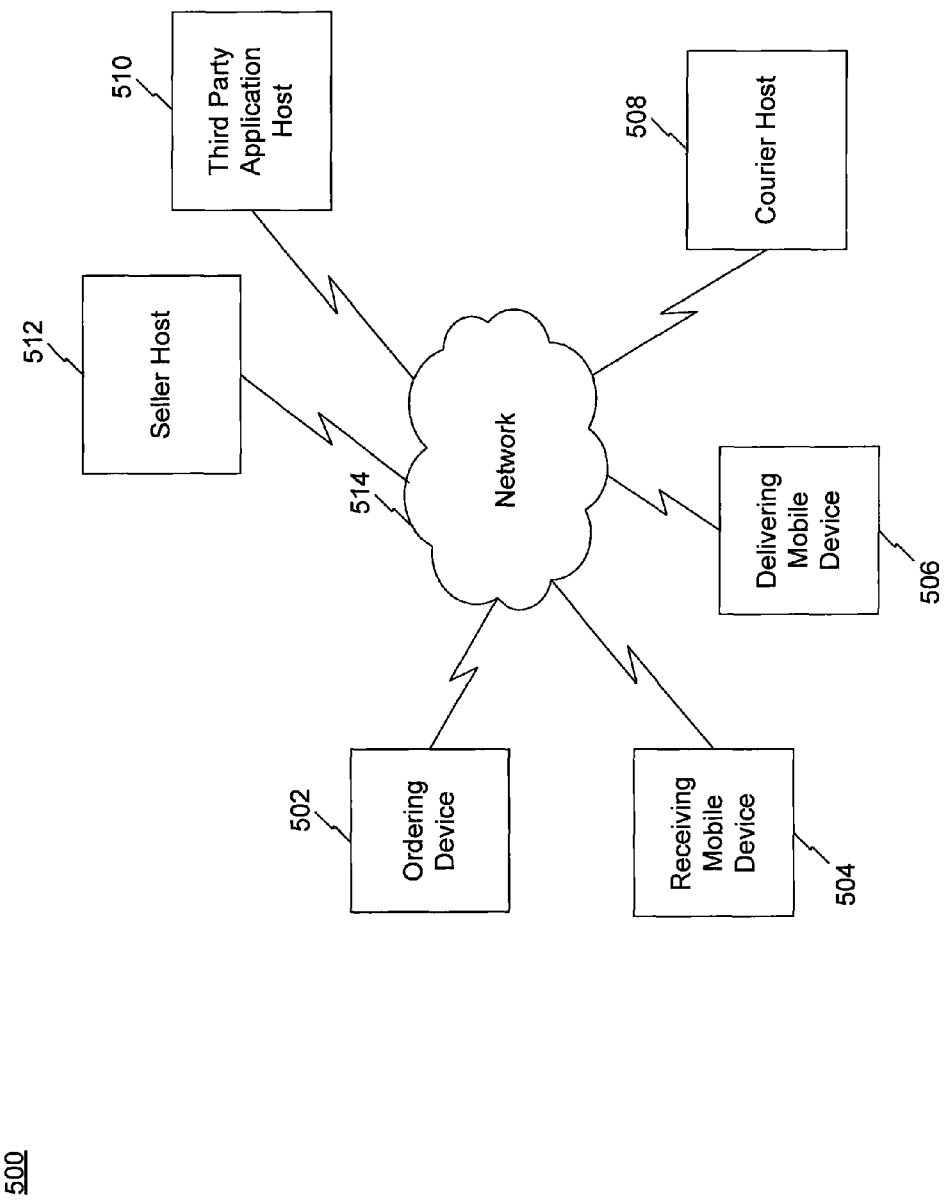
FIG. 5 illustrates an exemplary system for electronically signing for a delivered package by a receiving mobile device that is not possessed by a party identified with the order.

FIG. 5 illustrates an exemplary system 500 for electronically signing for a delivered package by a receiving mobile device that is not possessed by a party identified with the order. System 500 may include ordering device 502, receiving mobile device 504, and/or delivering mobile device 506. Receiving mobile device 504 may be similar to receiving mobile device 102 from FIG. 1. Similarly, delivering mobile device 506 may be similar to delivering mobile device 104.

System 500 may also include courier host 508, third party application host 510, and/or seller host 512. Ordering device 502, receiving mobile device 504, delivering mobile device 506 courier host 508, third party application host 510, and/or seller host 512 may be connected directly of via network 514. Network 514 may be similar to network 108 from FIG. 1.

An ordering party may place an order for goods from seller host 512, using ordering device 502. Ordering device 502 may be any type of computing device, such as a desktop, laptop, tablet, or mobile phone, for example. The ordering party may be associated with a private key and a public key. The private key may only be accessible to the ordering party and other parties to whom the ordering party grants permission. The public key, however, may be managed by a PKI and may be publicly available.

Thus, after the order is made, seller host 512 may have access to the public key of the ordering party. The seller device may generate a token, such as a string of letters and/or numbers, and may encrypt the token using the public key of the ordering device. Seller host 512 may pass the original token and/or the encrypted token to third party application host 510 and/or courier host 508. Courier host 508 may include the encrypted electronic token on the package as a barcode and/or may forward the encrypted electronic token to delivering mobile device 506.

When ordering device 502 places the order, it may indicate an address for delivery. In some embodiments, ordering device 502 may indicate that the package must be signed for before it is transferred to a receiving party. The ordering party may itself receive the package, or may delegate another party to receive the package. To delegate the other party, the ordering party may need to ensure that the receiving party has access to the private key of the ordering party.

Therefore, the ordering party may provide authorization to the receiving party by electronically transferring the private key to receiving mobile device 504. In some embodiments, the private key may itself be stored in an encrypted format. And in some embodiments, the private key may only be usable for a limited amount of time or a limited number of uses.

In some embodiments, the private key may be maintained on a remote server, such as third party application host 510. In that case, ordering device 502 may ensure that receiving mobile device 504 is able to access the private key or initiate a decryption using the private key stored on third party application host 510.

Third party application host 510 may be involved in enabling the electronic signature of the package. In some embodiments, third party application host may be involved or linked with an organization that created an application running on receiving mobile device 504 and/or delivering mobile device 506.

After receiving mobile device 504 becomes authorized to receive the package, it may electronically sign for the package at delivery. For example, receiving mobile device 504 may gain access to the encrypted electronic token, and may decrypt the encrypted electronic token. In some embodiments, the decryption may occur on receiving mobile device 504, while in other embodiments, receiving mobile device 504 may cause the decryption to occur on third party application host 510.

Figure 6:
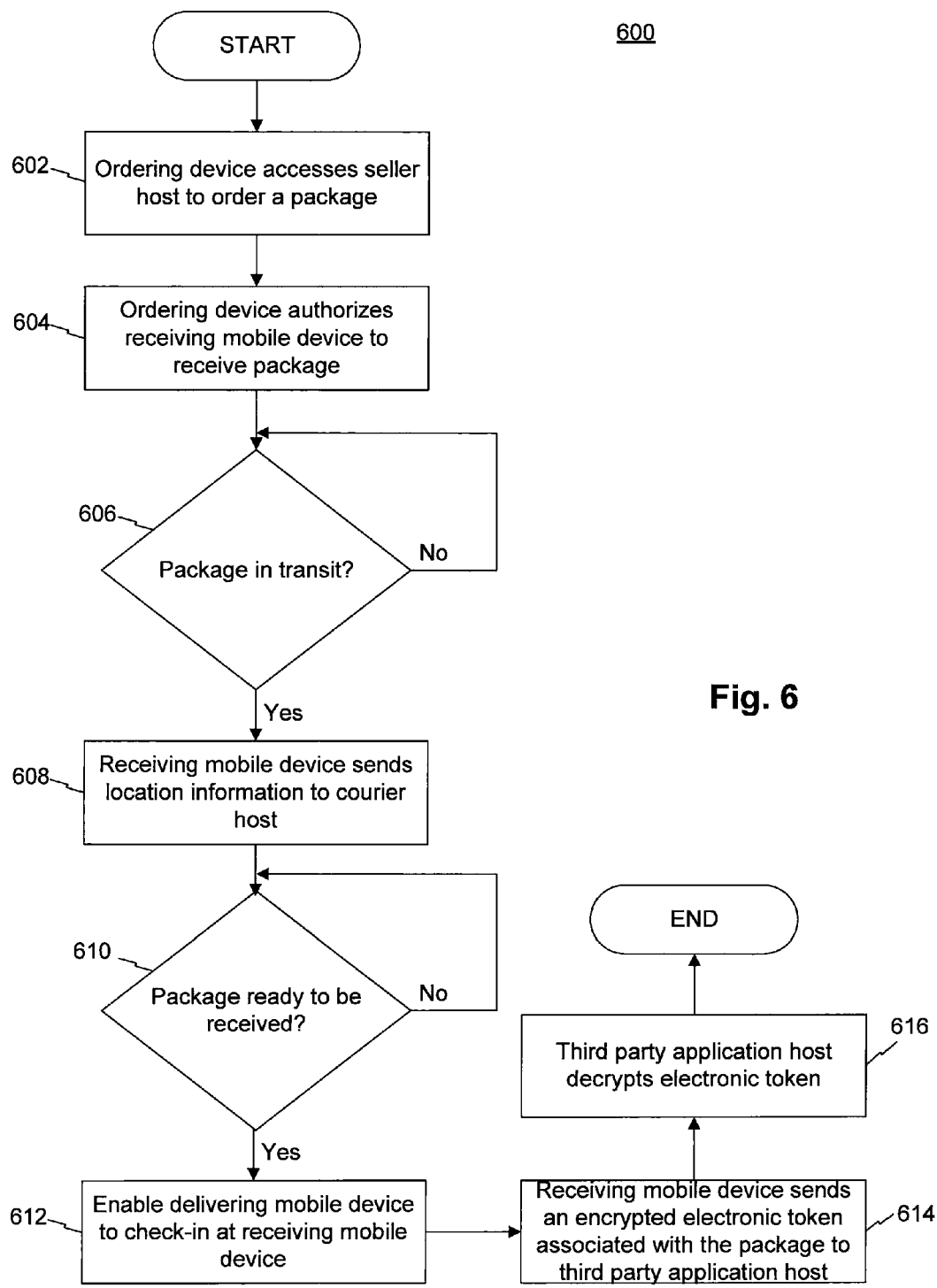
FIG. 6 illustrates operations of an exemplary method for electronically signing for a delivered package by a receiving mobile device that is not possessed by a party identified on the order.

FIG. 6 illustrates operations of an exemplary method 600 for electronically signing for a delivered package by a receiving mobile device 504 that is not possessed and/or is not operated by a party identified on the order. Method 600 may be executed by CPU 208 and/or 214 on some combination of ordering device 502, receiving mobile device 504, and third party application host 510, for example. Method 600 may also be performed in conjunction with other components not shown in system 500. As explained, some steps in method 600 are optional and can be rearranged. Additional steps can also be added to method 600.

To begin, ordering device 502 may access seller host 512 to order a package (step 602). Seller host 512, using a public key associated with the ordering party, may generate and encrypt a token when the order is made. Seller host 512 may forward the encrypted and unencrypted tokens to courier host 508. The encrypted electronic token may be passed to receiving mobile device 504, courier host 508, and/or third party application host 510. And the unencrypted electronic token may be forwarded to courier host 508 in order to verify decryption of the encrypted electronic token.

Next, ordering device 502, may authorize receiving mobile device 504 to receive the package (step 604). For example, ordering device 502 may electronically transfer its private key to receiving mobile device 504. In disclosed embodiments, ordering device 502 may authorize receiving mobile computer 504 to access the private key on third party host 510, or instruct third party host 510 to perform decryption if the private key is stored on third party application host 510.

Receiving mobile device 504 may be possessed, accompanied, and/or operated by a party different from the ordering party. Receiving mobile device 504 may be possessed, accompanied, and/or operated by a party different from any party associated with the order as well. The identity of party that possesses, accompanies, and/or operates receiving mobile device 504 may be unknown by the retailer, the delivery company, and/or the ordering party.

Next, the receiving mobile device 504 may determine whether the package is in transit, for example, by querying courier host 508 (step 606). For example, receiving mobile device 504 may determine that the package is out on the truck for delivery that day. When the package is determined to be in transit, receiving mobile device 504 may send location information to courier host 508 (step 608). The location information may indicate a location at which receiving mobile device 504 can receive the package.

Receiving mobile device 504 then determines if the package is ready to be received (step 610). For example, receiving mobile device 504 may receive an indication from courier host 508 that delivering mobile device 506 is approaching or is at the location indicated by receiving mobile device 504 at step 608, for example.

If the package is ready to be received, then receiving mobile device 504 may enable delivering mobile device 506 to check-in at a delivery location, for example, receiving mobile device 504 using an NFC bump, Bluetooth message, or RFID scan (step 612), for example. Next, receiving mobile device 504 may access an encrypted electronic token associated with the package, and may forward the encrypted electronic token to third party application host 510 (step 614).

Third party application host 616, upon receipt of the encrypted electronic token, may determine that receiving mobile device 504 is authorize to instruct decryption. Thereafter, third party application host 616 may decrypt the electronic token with a private key of the ordering party (step 616).

Third party application host 616 may then send a message to courier host 508 with the decrypted token. If the decrypted token matches the original token before it was encrypted, then courier host may determine that the package has been electronically signed for by an authorized party.

In some embodiments, the decryption make occur on receiving mobile device 504 instead of third party application host 510. In that case, receiving mobile device 504 would send the decrypted token to courier host 508, for example, to verify that it matches the original unencrypted token generated by seller host 512, for example. Method 600 may then end.

While certain features and embodiments of the invention have been described, other embodiments of the invention will be apparent to those skilled in the art from consideration of the specification and practice of the embodiments of the invention disclosed herein. Furthermore, although aspects of embodiments of the present invention have been described in part as software, computer-executable instructions, and/or other data stored in memory and other storage mediums, one skilled in the art will appreciate that these aspects can also be stored on or read from other types of tangible, non-transitory computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the invention.

It is intended that the specification and examples be considered as exemplary only, with a true scope and spirit of the invention being indicated by the following claims.

What is claimed is:

1. A method comprising:
    receiving, at a mobile device, authorization to receive delivery of at least one physical package ordered by a particular party and being sent to a first location, wherein receiving the authorization includes receiving, after the particular party orders the at least one physical package, a private key associated with the particular party;
    transmitting a request that the at least one physical package be delivered to a second location that is different than the first location while the at least one physical package is in transit to the first location;
    identifying, using the mobile device, at the second location, an encrypted electronic token associated with the at least one physical package, the electronic token having been encrypted by a public key associated with the particular party; and
    electronically signing, using the mobile device, for the at least one physical package, including decrypting the encrypted electronic token using the private key associated with the particular party.

2. The method of claim 1, wherein the private key is stored on the mobile device in a protected format.

3. The method of claim 1, wherein the particular party is different from a receiving party associated with the mobile device when the mobile device electronically signs for the at least one physical package.

4. The method of claim 1, wherein electronically signing for the at least one physical package completes delivery of the at least one physical package.

5. The method of claim 1, wherein the requesting causes the second party to deviate from a planned delivery route.

6. The method of claim 1, further comprising:
releasing a payment associated with the at least one physical package upon electronically signing for the at least one physical package.

7. The method of claim 1, further comprising:
enabling a second party delivering the at least one physical package to check-in at a delivery location using a delivering mobile device.

8. The method of claim 7, wherein the check-in comprises at least one of a near field communication (NFC) bump or a Bluetooth message between the mobile device and the delivering mobile device.

9. The method of claim 7, further comprising:
receiving the encrypted electronic token from the delivering mobile device during the check-in.

10. A non-transitory computer-readable storage medium storing program instructions, which, when executed by at least one processor, cause the at least one processor to perform a method comprising:
receiving, at a mobile device, authorization to receive delivery of at least one physical package ordered by a particular party and being sent to a first location, wherein receiving the authorization includes receiving, after the particular party orders the at least one physical package, a private key associated with the particular party;
transmitting a request that the at least one physical package be delivered to a second location that is different than the first location while the at least one physical package is in transit to the first location;
identifying, using the mobile device, at the second location, an encrypted electronic token associated with the at least one physical package, the electronic token having been encrypted by a public key associated with the particular party; and
electronically signing, using the mobile device, for the at least one physical package, including decrypting of the encrypted electronic token using the private key associated with the particular party.

11. The computer-readable medium of claim 10, wherein the private key is stored on the mobile device in a protected format.

12. The computer-readable medium of claim 10, wherein the particular party is different from a receiving party that is associated with the mobile device when the mobile device electronically signs for the at least one physical package.

13. The computer-readable medium of claim 10, wherein electronically signing for the package completes delivery of the at least one physical package.

14. The computer-readable medium of claim 10, wherein the requesting causes the second party to deviate from a planned delivery route.

15. The computer-readable medium of claim 10, the method further comprising:
releasing a payment associated with the at least one physical package upon electronically signing for the at least one physical package.

16. The computer-readable medium of claim 10, the method further comprising:
enabling a second party delivering the at least one physical package to check-in at a delivery location using a delivering mobile device.

17. The computer-readable medium of claim 16, wherein the check-in comprises at least one of a near field communication (NFC) bump or a Bluetooth message between the mobile device and the delivering mobile device.

18. The computer-readable medium of claim 16, the method further comprising:
receiving the encrypted electronic token from the delivering mobile device during the check-in.

19. A system comprising:
a receiving mobile device comprising at least one processor; and a memory storing software instructions, that when executed by at least one processor cause the at least one processor to perform operations including:
receiving authorization to receive delivery of at least one physical package ordered by a particular party and being sent to a first location, wherein the authorization includes receiving, after the particular party orders the at least one physical package, a private key associated with the particular party;
transmitting a request that the at least one physical package be delivered to a second location that is different than the first location while the at least one physical package is in transit to the first location
identifying, at the second location, an encrypted electronic token associated with the at least one physical package, the electronic token having been encrypted by a public key associated with the particular party; and
electronically signing for the at least one physical package, including decrypting of the encrypted electronic token using the private key associated with the particular party.

20. The system of claim 19, wherein the receiving mobile device is further configured to store the private key in a protected format.

21. The system of claim 19, wherein the particular party is an ordering party, the system further comprising:
an ordering device configured to order the at least one physical package according to user input from the ordering party, wherein the ordering party is different from a receiving party that is associated with the receiving mobile device when the receiving mobile device electronically signs for the at least one physical package.

22. The system of claim 19, wherein electronically signing for the package completes delivery of the at least one physical package.

23. The system of claim 19, wherein the delivering mobile device is configured to:
generate a new delivery route that deviates from a previously-planned delivery route.

24. The system of claim 19, wherein the receiving mobile device is further configured to:
release a payment associated with the package upon electronically signing for the at least one physical package.

25. The system of claim 19, further comprising a delivering mobile device configured to check-in at a delivery location.

26. The system of claim 25, wherein the check-in comprises at least one of a near field communication (NFC) bump or a Bluetooth message between the receiving mobile device and the delivering mobile device.

27. The system of claim 25, wherein the receiving mobile device is further configured to receive the encrypted electronic token from the delivering mobile device during the check-in.

* * * * *